United States Patent
Alshaye (10) Patent No.: US 10,888,815 B2
(45) Date of Patent: Jan. 12, 2021

(54) DRYING COMPRESSED GAS

(71) Applicant: Saudi Arabian Oil Company, Dhahran (SA)

(72) Inventor: Abdulmajeed Alshaye, Dhahran (SA)

(73) Assignee: Saudi Arabian Oil Company, Dhahran (SA)

(*) Notice: Subject to any disclaimer, the term of this patent is extended or adjusted under 35 U.S.C. 154(b) by 195 days.

(21) Appl. No.: 16/047,748

(22) Filed: Jul. 27, 2018

(65) Prior Publication Data

US 2020/0030742 A1    Jan. 30, 2020

(51) Int. Cl.
*B01D 53/26* (2006.01)
*F24F 3/14* (2006.01)

(52) U.S. Cl.
CPC ......... *B01D 53/261* (2013.01); *B01D 53/265* (2013.01); *F24F 3/1429* (2013.01); *B01D 2257/80* (2013.01); *B01D 2259/40088* (2013.01); *F24F 2003/1446* (2013.01); *F24F 2003/1458* (2013.01)

(58) Field of Classification Search
CPC ...... F24F 3/1429; F24F 3/1411; F24F 3/1417; B01D 53/04; B01D 53/261; B01D 53/265; B01D 2257/80; B01D 2259/40088
USPC .......... 95/117, 126; 96/121; 34/80, 472, 473
See application file for complete search history.

(56) References Cited

U.S. PATENT DOCUMENTS

| | | | | | |
|---|---|---|---|---|---|
| 3,477,204 | A | * | 11/1969 | Jackson | H01B 9/06 95/123 |
| 3,501,923 | A | * | 3/1970 | Lehmer | G21C 19/303 62/600 |
| 3,800,507 | A | * | 4/1974 | Howell | B01D 53/04 95/122 |
| 3,891,410 | A | * | 6/1975 | Hankison | B01D 53/26 95/14 |

(Continued)

FOREIGN PATENT DOCUMENTS

| EP | 2263778 | 12/2010 |
|---|---|---|
| WO | 00/53978 | 9/2000 |

OTHER PUBLICATIONS

International Search Report and Written Opinion issued in International Application No. PCT/US2019/042552 dated Nov. 5, 2019, 14 pages.

(Continued)

*Primary Examiner* — Frank M Lawrence, Jr.
(74) *Attorney, Agent, or Firm* — Fish & Richardson P.C.

(57) ABSTRACT

A system includes a cooler, a refrigeration cycle, one or more receivers, and multiple adsorption dryers. The cooler is configured to cool compressed air received from multiple compressors by exchange with a refrigerant. The refrigeration cycle is in fluid communication with the cooler. The refrigeration cycle includes the refrigerant circulating in the refrigeration cycle. The refrigeration cycle includes a refrigerant chiller configured to re-cool the refrigerant received from the cooler. The one or more receivers are downstream of the cooler and are configured to collect condensate from the cooled compressed air. The adsorption dryers are in parallel downstream of the one or more receivers. The adsorption dryers are configured to remove moisture from the cooled compressed air to form dried compressed air with a dew point of approximately −40° F. or below.

11 Claims, 4 Drawing Sheets

(56) References Cited

U.S. PATENT DOCUMENTS

| | | | |
|---|---|---|---|
| 4,237,696 A | | 12/1980 | Coblentz |
| 4,761,968 A | * | 8/1988 | Basseen ................. B01D 53/26 |
| | | | 62/271 |
| 4,783,432 A | * | 11/1988 | Settlemyer ........... B01D 53/261 |
| | | | 502/34 |
| 5,002,593 A | | 3/1991 | Ischishita et al. |
| 5,309,725 A | | 5/1994 | Cayce |
| 5,522,150 A | | 6/1996 | Schultz |
| 6,077,488 A | * | 6/2000 | Jain ........................ B01D 53/04 |
| | | | 423/210 |
| 6,171,377 B1 | * | 1/2001 | Henderson ............. B01D 53/04 |
| | | | 96/122 |
| 6,221,130 B1 | * | 4/2001 | Kolodziej ............ B01D 53/261 |
| | | | 95/120 |
| 6,375,722 B1 | * | 4/2002 | Henderson ......... B01D 53/0454 |
| | | | 96/112 |
| 6,984,258 B2 | * | 1/2006 | Niclout .............. B01D 53/0462 |
| | | | 62/641 |
| 7,922,790 B2 | * | 4/2011 | Vertriest ............. B01D 53/261 |
| | | | 95/117 |
| 9,243,810 B2 | | 1/2016 | Vandermeulen |
| 10,005,018 B2 | | 6/2018 | Battelle |
| 2017/0232384 A1 | | 8/2017 | De Piero et al. |

OTHER PUBLICATIONS

Korane, "Hybrid air dryers offer best of both worlds," Hydraulics and Pneumatics, Penton Media, Cleveland, OH, US, vol. 64, No. 2, Feb. 1, 2011, 5 pages.

GCC Examination Report in GCC Appln. No. GC 2019-37993, dated Aug. 19, 2020, 4 pages.

* cited by examiner

DRYING COMPRESSED GAS

TECHNICAL FIELD

This disclosure relates to drying a gas, and more specifically, compressed air.

BACKGROUND

Compressed air is used in a variety of applications in industrial processes. Air typically contains water in the form of water vapor. When air is cooled to a temperature less than the dew point, the water vapor condenses. Because high concentrations of water vapor and the presence of liquid are generally known as causes of corrosion and premature breakdown of piping systems and pneumatic instruments, compressed air is typically conditioned to remove water content.

SUMMARY

This disclosure describes technologies relating to drying a gas, and more specifically, compressed air. The subject matter described in this disclosure can be implemented in particular implementations, so as to realize one or more of the following advantages. Pressure drop through the compressed air drying system can be reduced, thereby minimizing system losses and increasing overall system efficiencies with respect to power usage associated with gas compression and hydraulic flow. The compressed air drying systems described herein have improved design flexibility and can support multiple compressors. The cooler of the compressed air drying systems described herein can support multiple compressors and multiple dryer units. The compressed air drying systems described herein can be installed new or integrated with existing compressed air drying systems to reduce operating costs. The compressed air drying systems described herein can have less capital costs and can require less energy consumption per unit volume of compressed air in comparison to other compressed air drying systems sized for the same target conditions, such as flow rate and dew point.

Certain aspects of the subject described here can be implemented as a system including a cooler, a refrigeration cycle, one or more receivers, and multiple adsorption dryers. The cooler is configured to cool compressed air received from multiple compressors by exchange with a refrigerant. The refrigeration cycle is in fluid communication with the cooler. The refrigeration cycle includes the refrigerant circulating in the refrigeration cycle. The refrigeration cycle includes a refrigerant chiller configured to re-cool the refrigerant received from the cooler. The one or more receivers are downstream of the cooler and are configured to collect condensate from the cooled compressed air. The adsorption dryers are in parallel downstream of the one or more receivers. The adsorption dryers are configured to remove moisture from the cooled compressed air to form dried compressed air with a dew point of approximately −40° F. or below.

This, and other aspects, can include one or more of the following features.

The cooler can include multiple subcoolers in parallel. Each subcooler can correspond to a respective compressor (of the multiple compressors).

The refrigerant can include water circulating in the refrigeration cycle at a temperature varying in a range of approximately 44° F. to approximately 80° F.

Each of the adsorption dryers can include a desiccant selected from silica gel, activated alumina, and a molecular sieve.

Each of the adsorption dryers can include a heater configured to vary and maintain a temperature within the respective adsorption dryer in a range of approximately 250° F.

The system can include a pre-cooler upstream of the cooler. The pre-cooler can be configured to pre-cool the compressed air received from the compressors by exchange with water circulating at a temperature varying in a range of approximately 90° F. to approximately 130° F., before the compressed air is cooled by the cooler.

Certain aspects of the subject matter described here can be implemented as a method. Compressed air received from multiple compressors is cooled by a cooler by exchange with a refrigerant. The refrigerant is circulated in a refrigeration cycle. The refrigerant is flowed through the cooler. The refrigerant received from the cooler is re-cooled by a refrigerant chiller. Condensate from the cooled compressed air is collected by one or more receivers downstream of the cooler. Moisture from the cooled compressed air is removed by multiple adsorption dryers in parallel downstream of the one or more receivers to form dried compressed air with a dew point of approximately −40° F. or below.

This, and other aspects, can include one or more of the following features.

The cooler can include multiple subcoolers in parallel. Each subcooler can correspond to a respective compressor (of the multiple compressors).

The refrigerant can include water. Circulating the refrigerant in the refrigeration cycle can include circulating the water at a temperature varying in a range of approximately 44° F. to approximately 80° F.

Each of the adsorption dryers can include a desiccant selected from silica gel, activated alumina, and a molecular sieve.

Each of the adsorption dryers can include a heater.

At least one of the multiple adsorption dryers can be heated by the respective heater to vary and maintain a temperature within the at least one of the multiple adsorption dryers in a range of approximately 70° F. to approximately 250° F.

The compressed air received from the multiple compressors can be pre-cooled by a pre-cooler upstream of the cooler by exchange with water circulating at a temperature varying in a rage of approximately 90° F. to approximately 130° F., before the compressed air is cooled by the cooler.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

Figure 1A:
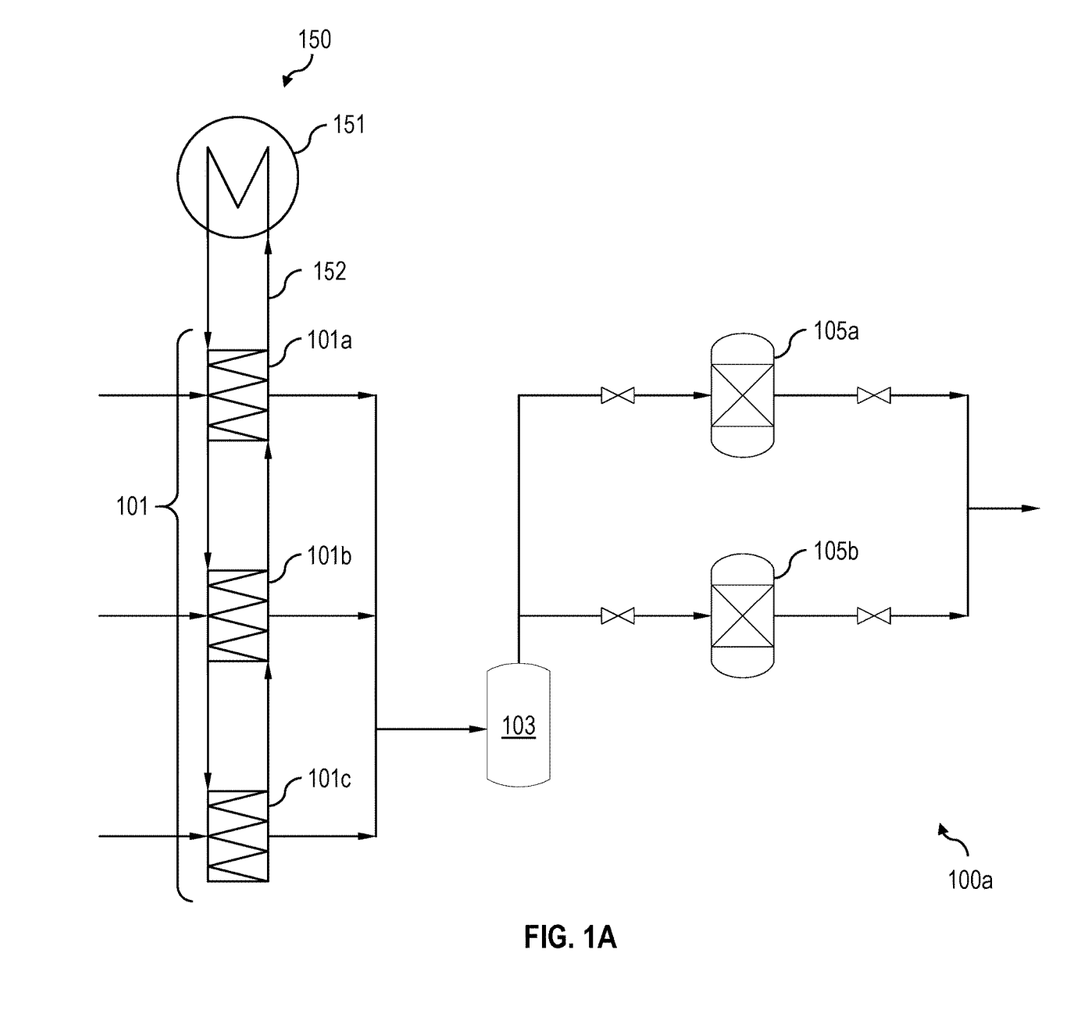
FIGS. 1A & 1B are schematic diagrams of example compressed air drying systems.
Figure 2:
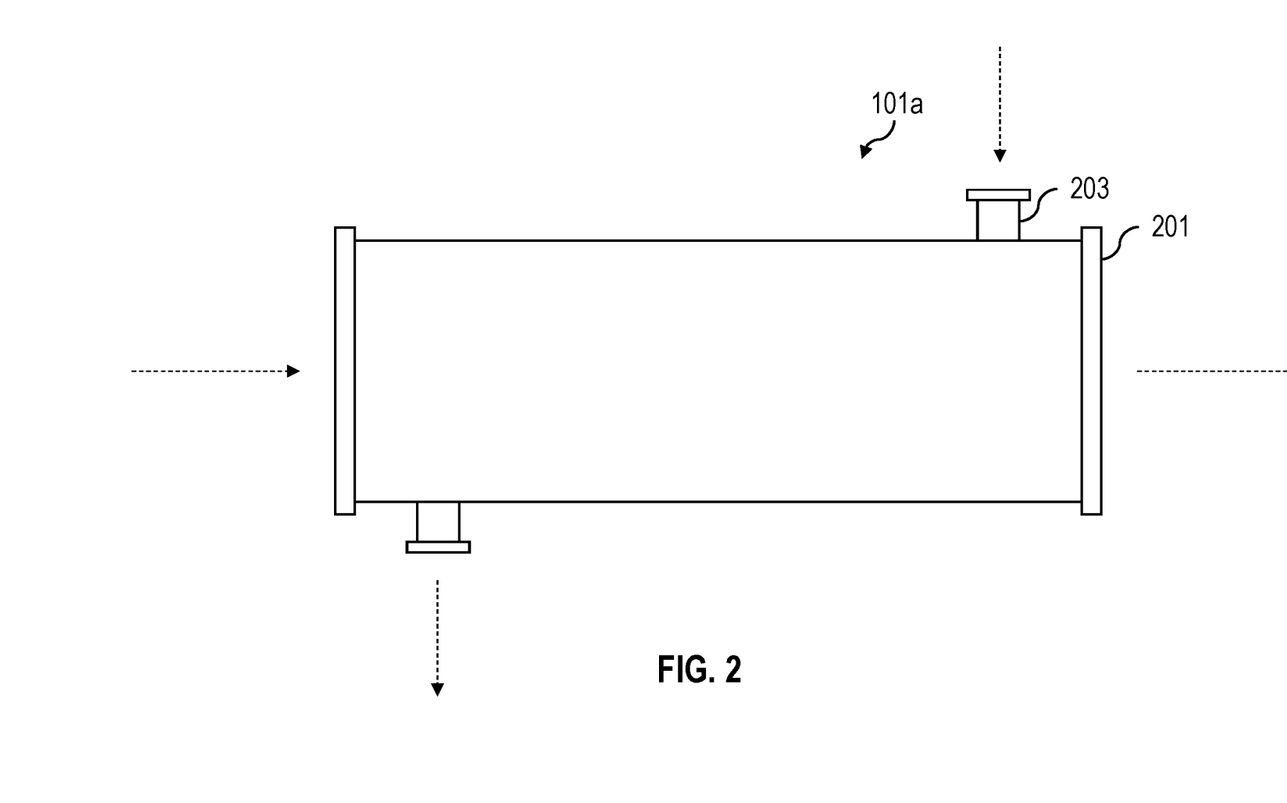
FIG. 2 is a schematic diagram of an example heat exchanger.

Referring to FIG. 1A, an implementation of a system 100*a* for drying compressed air includes a cooler 101, a receiver 103 downstream of the cooler 101, multiple adsorption dryers 105a and 105b in parallel downstream of the receiver 103, and a refrigeration cycle 150 in fluid communication with the cooler 101. The refrigeration cycle 150 includes a refrigerant chiller 151 and a refrigerant 152. The cooler 101 receives compressed air from multiple compressors (for example, three compressors as shown in FIG. 1A) and cools the compressed air by exchange with the refrigerant 152. In some implementations, the cooler 101 includes multiple subcoolers (for example, three subcoolers 101a, 101b, and 101c as shown in FIG. 1A). The subcoolers (101a, 101b, 101c) can be in a parallel flow configuration in the cooler 101. The number of subcoolers can correspond to the number of compressors from which compressed air is received. Although shown as having three subcoolers 101a, 101b, and 101c, the system 100a can include fewer subcoolers (for example, two) or additional subcoolers. In some implementations, one subcooler (for example, 101a) can support cooling of compressed air received from multiple compressors. In some implementations, each subcooler (101a, 101b, 101c) includes a shell and tube heat exchanger (an example is shown in FIG. 2) or other types of heat exchangers that allow for low pressure drops (such as double pipe heat exchangers). By heat exchange with the refrigerant 152 in the cooler 101, the compressed air can be cooled, for example, to approximately 70° F.

The compressed air from the compressors typically contain moisture in the form of water vapor, and cooling the compressed air in the cooler 101 can cause a significant amount of the water to condense. In some implementations, cooling the compressed air in the cooler 101 causes approximately 85% of the original water vapor content in the compressed air to condense. In cases where the compressed air also contains condensable contaminants, cooling in the cooler 101 can cause such contaminants to condense as well. The receiver 103 receives the cooled compressed air and condensed material (also referred as condensate, which can include liquid water and other condensed contaminants, such as oil aerosols from the compressors) from the cooler 101. The receiver 103 can collect the condensate, and the vapor portion of the compressed air can continue to flow downstream to the adsorption dryers 105a and 105b. Although shown as having one receiver 103, the system 100a can include additional receivers. The system 100a can also include one or more additional separation devices, such as a cyclonic separator to facilitate the separation of vapor and liquid phases. For example, the system 100a can include a cyclonic separator directly upstream of the receiver 103. In some implementations, the receiver 103 itself can be a cyclonic separator. In some implementations, the receiver 103 can include a cyclonic separator.

The adsorption dryers 105a and 105b can include a desiccant to further remove remaining moisture content from the compressed air. The desiccant is a solid material capable of adsorbing water molecules as the compressed air flows through. Some non-limiting examples of suitable desiccant include silica gel, activated alumina, and a molecular sieve. The adsorption dryers 105a and 105b can remove moisture from the cooled compressed air to form dried compressed air with a dew point of approximately −40° F. or below. In some implementations, the desiccant removes moisture from the compressed air efficiently when the compressed air is at a cool temperature (for example, in a range of 60° F. to 80° F.) and has a relative humidity of approximately 100%.

In some implementations, the adsorption dryers 105a and 105b are vessels (including desiccant) mounted as part of a skid and connected with multiple switching valves. Because the adsorption dryers 105a and 105b are in a parallel flow configuration, one of the dryers (for example, 105a) can be used to remove moisture from the compressed air, while the other dryer (for example, 105b) undergoes regeneration of the desiccant. The roles can then be reversed, such that the compressed air is routed to the dryer (105b) with regenerated desiccant, and the dryer (105a) can undergo regeneration of the desiccant. The switching valves can be closed or opened according to the desired roles of each of the dryers (105a, 105b). For example, a switching valve can be closed to isolate one of the dryers (for example, 105b) from the flow of compressed air as that dryer (105b) undergoes regeneration. To switch roles of the dryers, the switching valve can be opened, so that compressed air can flow to the dryer (105b), and another switching valve can be closed to isolate the other dryer (105a) from the flow of compressed air as that dryer (105a) undergoes regeneration.

Although shown as having two adsorption dryers 105a and 105b, the system 100a can include additional adsorption dryers in parallel. The dryers 105a and 105b can include heaters and coolers configured to vary and maintain the temperature within the respective dryers 105a and 105b. For example, the heaters and coolers can be used to adjust the temperature of the respective dryers 105a and 105b within a range of approximately 70° F. to approximately 250° F. The cooler of dryer 105a can be used to maintain the temperature within the dryer 105a at approximately 70° F. while compressed air flows through the dryer 105a, and the heater of dryer 105b can be used to maintain the temperature within the dryer 105b at approximately 250° F. while its desiccant is regenerated. Conversely, heater of dryer 105a can be used to maintain the temperature within the dryer 105a at approximately 250° F. while its desiccant is regenerated, and the cooler of dryer 105b can be used to maintain the temperature within the dryer 105b at approximately 70° F. while compressed air flows through the dryer 105b. Once the desiccant within one of the dryers (105a or 105b) is saturated with water, it can be beneficial to start the desiccant regeneration for that dryer. In some implementations, an increase in the dew point of the compressed air exiting the dryer (105a or 105b) can be an indication that the desiccant is saturated with water. The cooling of the compressed air in the cooler 101 can decrease the frequency of such desiccant regeneration cycles.

Still referring to FIG. 1A, the refrigeration cycle 150 supplies the refrigerant 152 to the cooler 101 as a source of cooling for the compressed air flowing through the cooler 101. The refrigerant 152 can include water circulating in the refrigeration cycle at a temperature varying in a range of approximately 44° F. to approximately 80° F. For example, the refrigerant 152 can be supplied to the cooler 101 at approximately 50° F. After exchanging heat with the compressed air, the refrigerant 152 can exit the cooler 101, for example, at approximately 70° F. The refrigerant chiller 151 can re-cool the refrigerant 152 received from the cooler 101, for example, back to approximately 50° F. Although not shown, the refrigeration cycle 150 can include a surge drum to reserve a volume of refrigerant in case of process fluctuations and a recirculation pump to provide circulation of the refrigerant 152 in the refrigeration cycle 150.

Figure 1B:
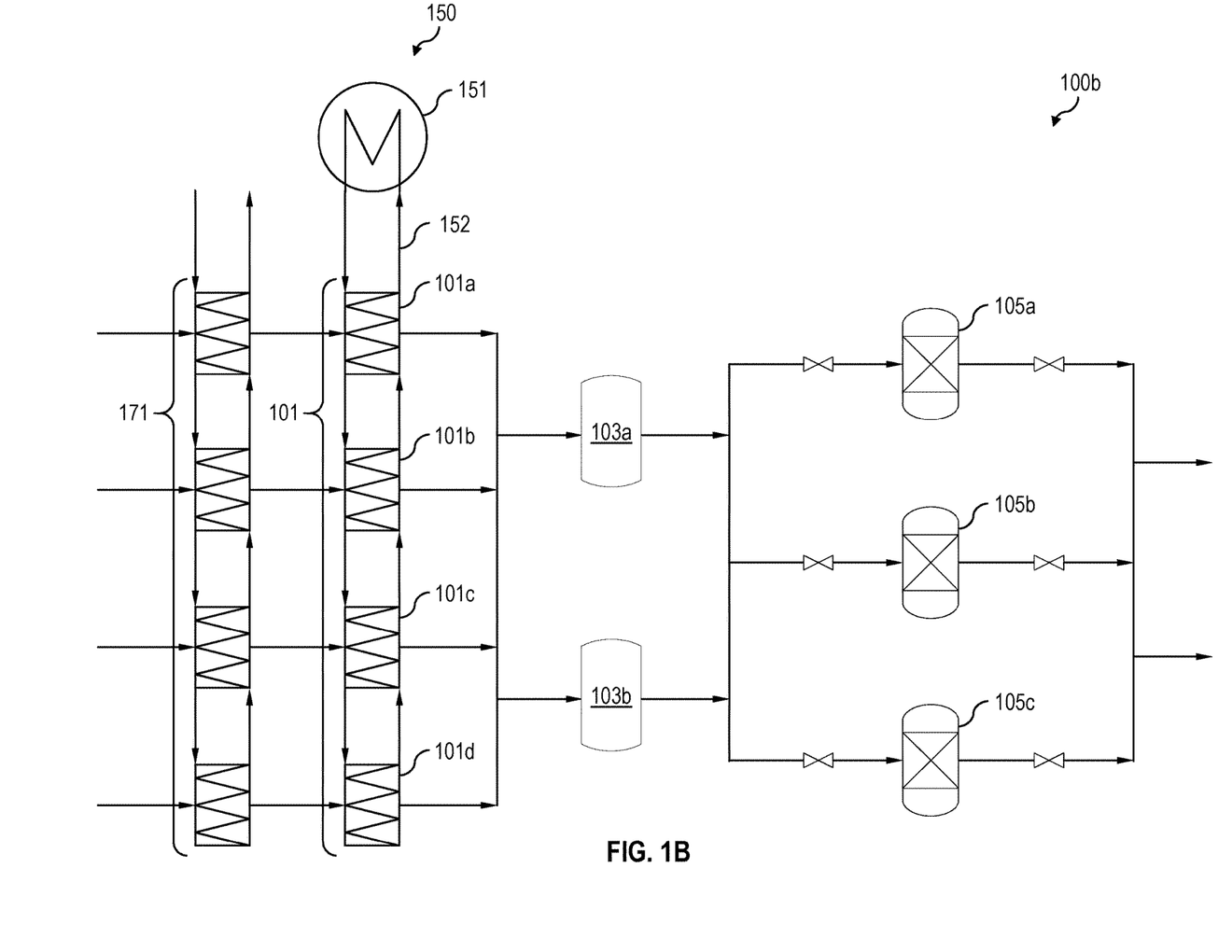

FIG. 1B illustrates an implementation of a system 100b (similar to the system 100a) for drying compressed air. The system 100b includes the cooler 101, two receivers 103a and 103b downstream of the cooler 101, multiple adsorption dryers 105a, 105b, and 105c in parallel downstream of the receivers 103a and 103b, and a refrigeration cycle 150 in fluid communication with the cooler 101. The refrigeration cycle 150 includes the refrigerant chiller 151 and the refrigerant 152. The cooler 101 receives compressed air from multiple compressors (for example, four compressors as shown in FIG. 1B) and cools the compressed air by exchange with the refrigerant 152. The cooler 101 can include multiple subcoolers (for example, four subcoolers 101a, 101b, 101c, and 101d as shown in FIG. 1A). The subcoolers (101a, 101b, 101c, 101d) can be in a parallel flow configuration in the cooler 101. In some implementations, one subcooler (for example, 101a) can support cooling of compressed air received from multiple compressors. Each subcooler (101a, 101b, 101c, 101d) can include a shell and tube pipe heat exchanger (an example is shown in FIG. 2) or other types of heat exchangers that allow for low pressure drops (such as double pipe heat exchangers).

The receivers 103a and 103b receive the cooled compressed air and condensate from the cooler 101. The receivers 103a and 103b can be in a parallel flow configuration, such that both the receivers 103a and 103b together can support the total flow of compressed air and condensate downstream of the cooler 101. Although shown as having two receivers 103a and 103b, the system 100b can include additional receivers. For example, the system 100b can include a receiver for each respective subcooler (101a, 101b, 101c, 101d) of the cooler 101.

The adsorption dryers 105a, 105b, and 105c include desiccant to further remove remaining moisture content from the compressed air. Because the adsorption dryers 105a, 105b, and 105c are in a parallel flow configuration, one or more of the dryers (for example, dryers 105a and 105b) can be used to remove moisture from the compressed air, while a remainder of the dryers (for example, dryer 105c) can undergo regeneration of the desiccant. The dryers 105a, 105b, 105c can include heaters configured to vary and maintain the temperature within the respective dryers 105a, 105b, and 105c. The heaters can be used to vary and maintain the temperature within their respective dryers 105a, 105b, and 105c based on the cycling between air drying and desiccant regeneration.

Still referring to FIG. 1B, the system 100b can include a pre-cooler 171 upstream of the cooler 101. The pre-cooler 171 receives compressed air from multiple compressors (for example, four compressors as shown in FIG. 1B) and pre-cools the compressed air before the compressed air is further cooled by the cooler 101. Similar to the cooler 101, the pre-cooler 171 can include multiple heat exchangers (for example, four) in a parallel flow configuration. The heat exchangers of the pre-cooler 171 can be shell and tube heat exchangers (an example is shown in FIG. 2) or other types of heat exchangers that allow for low pressure drops (such as double pipe heat exchangers). The refrigerant used in the pre-cooler 171 can be substantially the same or different from the refrigerant 152 used in the cooler 101. In some implementations, the pre-cooler 171 also uses water as its refrigerant, but the water circulates at an intermediate temperature range (between the operating range of the cooler 101 and the upstream compressors). For example, the pre-cooler 171 utilizes cooling water (available from the facility for which the compressed air is being dried) circulating at a temperature varying in a range of approximately 90° F. to approximately 130° F. The pre-cooler 171 can reduce the cooling load of the refrigeration cycle 150.

FIG. 2 is a simplified view of an example subcooler 101a. The subcooler 101a can be a shell and tube heat exchanger including a shell 201 and tube 203. In some implementations, compressed air flows through the shell 201, and the refrigerant 152 flows through the tube 203. In some implementations, the refrigerant 152 flows through the shell 201, and compressed air flows through the tube 203. In some portions in the subcooler 101a, the compressed air and the refrigerant 152 flow in the same direction. In other portions in the subcooler 101a, the compressed air and the refrigerant 152 flow in opposite directions.

Although not shown, the subcooler 101a can include insulation surrounding the shell 201, such that heat dissipation to the environment is reduced or eliminated. The use of a shell and tube heat exchanger can reduce the pressure drop of both the compressed air and the refrigerant 152 flowing through the subcooler 101a in comparison to other heat exchanger designs (such as a plate and frame heat exchanger).

Figure 3:
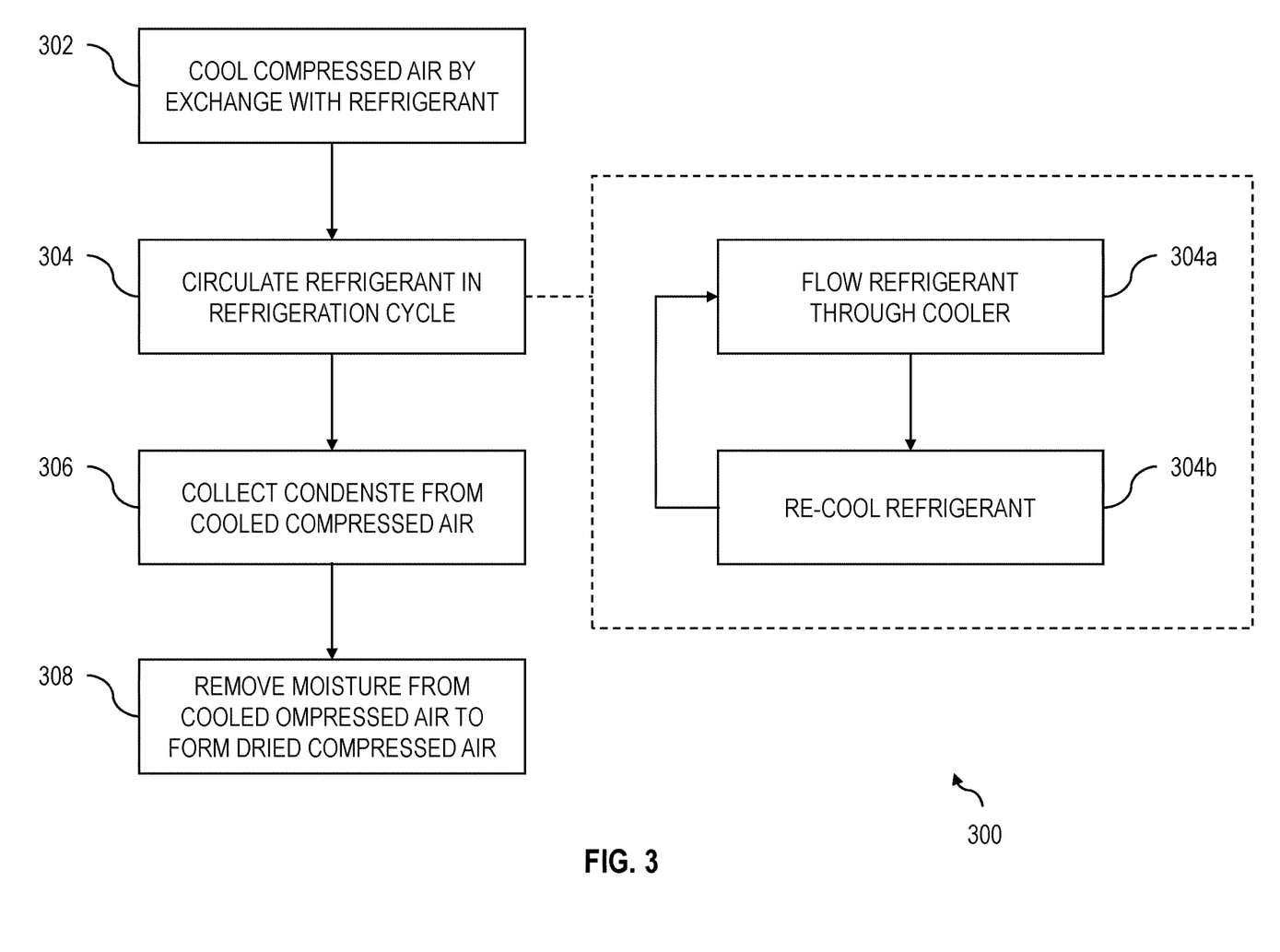
FIG. 3 is a flowchart of an example method for drying compressed air.

FIG. 3 is a flow chart illustrating a method 300 for drying compressed air. The method 300 can be applicable, for example, to systems 100a and 100b. At step 302, compressed air received from multiple compressors is cooled by a cooler (101) by exchange with a refrigerant (152). The compressed air can be cooled by the cooler 101 to a temperature of approximately 70° F. As mentioned previously, cooling the compressed air in the cooler 101 can cause components in the compressed air (for example, water and contaminants) to condense.

At step 304, the refrigerant 152 is circulated in a refrigeration cycle (150). The circulation of the refrigerant 152 in the refrigeration cycle 150 includes flowing the refrigerant 152 through the cooler 101 at step 304a and re-cooling the refrigerant 152 received from the cooler 101 by a refrigerant chiller (151) at step 304b. The refrigerant 152 can include water circulating at a temperature varying in a range of approximately 44° F. to approximately 80° F. For example, the refrigerant 152 can be flowed to the cooler 101 at a temperature of approximately 50° F. After flowing through the cooler 101, the refrigerant 152 can return to the refrigerant chiller 151 at a temperature of approximately 75° F., and the refrigerant 152 can be re-cooled to approximately 50° F. before being circulated back to the cooler 101. Circulation of the refrigerant 152 in the refrigeration cycle 150 can be provided, for example, by a circulation pump.

At step 306, condensate from the cooled compressed air is collected by one or more receivers (103) downstream of the cooler 101. The vapor portion of the cooled compressed air can continue to flow downstream. The condensate collected at step 306 can accumulate and be periodically drained from the one or more receivers (103).

At step 308, moisture from the cooled compressed air is removed by multiple adsorption dryers (105a, 105b) in parallel, downstream of the one or more receivers (103), to form dried compressed air with a dew point of approximately −40° F. or below. As mentioned previously, one of the dryers (for example, 105a) can be used to remove moisture from the compressed air at step 308, while the other dryer (for example, 105b) undergoes regeneration of the desiccant. The roles of the dryers 105a and 105b can be switched, so that the desiccant of the dryer previously being used to remove moisture from the compressed air can be regenerated, and dryer previously undergoing desiccant regeneration can be used to remove moisture from the compressed air. Regeneration of the desiccant can include heating to maintain a temperature of approximately 250° F.

In this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

In this disclosure, "approximately" means a deviation or allowance of up to 10 percent (%) and any variation from a mentioned value is within the tolerance limits of any machinery used to manufacture the part. Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise. "About" can allow for a degree of variability in a value or range, for example, within 10%, within 5%, or within 1% of a stated value or of a stated limit of a range.

While this disclosure contains many specific implementation details, these should not be construed as limitations on the scope of the subject matter or on the scope of what may be claimed, but rather as descriptions of features that may be specific to particular implementations. Certain features that are described in this disclosure in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results.

Accordingly, the previously described example implementations do not define or constrain this disclosure. Other changes, substitutions, and alterations are also possible without departing from the spirit and scope of this disclosure.

What is claimed is:

1. A system comprising:
a cooler configured to cool compressed air received from a plurality of compressors by exchange with a refrigerant, the cooler comprising a plurality of subcoolers in parallel, each subcooler corresponding to a respective compressor of the plurality of compressors;
a refrigeration cycle in fluid communication with the cooler, the refrigeration cycle comprising:
the refrigerant circulating in the refrigeration cycle; and
a refrigerant chiller configured to re-cool the refrigerant received from the cooler;
one or more receivers downstream of the cooler, the one or more receivers configured to collect condensate from the cooled compressed air; and
a plurality of adsorption dryers in parallel downstream of the one or more receivers, the plurality of adsorption dryers configured to remove moisture from the cooled compressed air to form dried compressed air with a dew point of approximately 40° F. or below.

2. The system of claim 1, wherein the refrigerant comprises water circulating in the refrigeration cycle at a temperature varying in a range of approximately 44° F. to approximately 80° F.

3. The system of claim 1, wherein each of the adsorption dryers comprises a desiccant selected from silica gel, activated alumina, and a molecular sieve.

4. The system of claim 3, wherein each of the adsorption dryers comprises a heater configured to vary and maintain a temperature within the respective adsorption dryer in a range of approximately 70° F. to approximately 250° F.

5. The system of claim 1, further comprising a pre-cooler upstream of the cooler, the pre-cooler configured to, before the compressed air is cooled by the cooler, pre-cool the compressed air received from the plurality of compressors by exchange with water circulating at a temperature varying in a range of approximately 90° F. to approximately 130° F.

6. A method comprising:
cooling, by a cooler, compressed air received from a plurality of compressors by exchange with a refrigerant, the cooler comprising a plurality of subcoolers in parallel, each subcooler corresponding to a respective compressor of the plurality of compressors;
circulating the refrigerant in a refrigeration cycle, the circulating comprising:
flowing the refrigerant through the cooler; and
re-cooling, by a refrigerant chiller, the refrigerant received from the cooler;
collecting condensate, by one or more receivers downstream of the cooler, from the cooled compressed air; and
removing moisture, by a plurality of adsorption dryers in parallel downstream of the one or more receivers, from the cooled compressed air to form dried compressed air with a dew point of approximately 40° F. or below.

7. The method of claim 6, wherein the refrigerant comprises water, and circulating the refrigerant in the refrigeration cycle comprises circulating the water at a temperature varying in a range of approximately 44° F. to approximately 80° F.

8. The method of claim 6, wherein each of the adsorption dryers comprises a desiccant selected from silica gel, activated alumina, and a molecular sieve.

9. The method of claim 8, wherein each of the adsorption dryers comprises a heater.

10. The method of claim 9, further comprising heating at least one of the plurality of adsorption dryers, by the respective heater, to vary and maintain a temperature within the at least one of the plurality of adsorption dryers in a range of approximately 70° F. to approximately 250° F.

11. The method of claim 6, further comprising pre-cooling, by a pre-cooler upstream of the cooler, the compressed air received from the plurality of compressors by exchange with water circulating at a temperature varying in a range of approximately 90° F. to approximately 130° F., before the compressed air is cooled by the cooler.

* * * * *

UNITED STATES PATENT AND TRADEMARK OFFICE
CERTIFICATE OF CORRECTION

Page 1 of 1

PATENT NO. : 10,888,815 B2
APPLICATION NO. : 16/047748
DATED : January 12, 2021
INVENTOR(S) : Abdulmajeed Alshaye It is certified that error appears in the above-identified patent and that said Letters Patent is hereby corrected as shown below:

In the Claims

In Column 8, Line 15, Claim 1, please replace "40°" with -- -40° --

In Column 8, Line 50, Claim 6, please replace "40°" with -- -40° --

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*